(12) United States Patent
Mengele et al.

(10) Patent No.: US 12,317,767 B2
(45) Date of Patent: Jun. 3, 2025

(54) IMPLEMENT HITCH CONTROL SYSTEM

(71) Applicant: AGCO International GmbH, Neuhausen (CH)

(72) Inventors: Juergen Mengele, Marktoberdorf (DE); Daniel Muff-Mueller, Marktoberdorf (DE); Gerhard Mariner, Bidingen (DE); Peter Miller, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 638 days.

(21) Appl. No.: 17/597,334

(22) PCT Filed: Jun. 1, 2020

(86) PCT No.: PCT/EP2020/065114
§ 371 (c)(1),
(2) Date: Jan. 3, 2022

(87) PCT Pub. No.: WO2021/001101
PCT Pub. Date: Jan. 7, 2021

(65) Prior Publication Data
US 2022/0240428 A1    Aug. 4, 2022

(30) Foreign Application Priority Data

Jul. 1, 2019    (GB) ..................................... 1909474

(51) Int. Cl.
*A01B 63/114*    (2006.01)
(52) U.S. Cl.
CPC ................... *A01B 63/114* (2013.01)
(58) Field of Classification Search
None
See application file for complete search history.

(56) References Cited

U.S. PATENT DOCUMENTS 4,508,176 A * 4/1985 Wiegardt ................. G05G 1/04
                                                                200/61.54
4,969,527 A   11/1990 Boe et al.
                        (Continued)

FOREIGN PATENT DOCUMENTS

EP    0112642 A2    7/1984
EP    1609345 A1    12/2005
                (Continued)

OTHER PUBLICATIONS

UK Intellectual Property Office, Search report for related UK Application No. GB1909474.7, dated Dec. 20, 2019.
(Continued)

*Primary Examiner* — Erin D Bishop
*Assistant Examiner* — Mahmoud M Kazimi (57) ABSTRACT

A control system for an implement hitch of an agricultural vehicle, wherein the hitch is mounted to the vehicle and includes one or more hydraulic cylinders or other actuators operable to raise and lower the hitch between minimum and maximum heights relative to the vehicle and hold the hitch static at one or more heights between the minimum and maximum heights. The control system includes a rocker control device having a first operating position and being movable in a first direction to a first limit position and in a second direction to a second limit position. An electronic control unit (ECU) is connected to the rocker control device and controls operation of the or each of the hydraulic cylinders or actuators and thereby control raising and lowering of the hitch in response to user operation of the rocker control device. The ECU is operable to control raising and lowering of the hitch to move it to a selected one of two or more previously stored positions between the said minimum and maximum heights, and to switch between the said previously stored positions in response to a predetermined first actuation operation of the same rocker control device.

(Continued)

Preferably, the same rocker control device is used to control the input and storage of at least one further height value.

9 Claims, 5 Drawing Sheets

(56) References Cited

U.S. PATENT DOCUMENTS

| | | | |
|---|---|---|---|
| 5,012,415 | A | 4/1991 | Boe et al. |
| 6,076,612 | A | 6/2000 | Carr et al. |
| 6,216,794 | B1 | 4/2001 | Buchl |
| 6,216,795 | B1 | 4/2001 | Buchl |
| 10,053,146 | B2 * | 8/2018 | Morselli ................ B62D 5/093 |
| 10,392,774 | B2 * | 8/2019 | Dauderman ............ E02F 9/226 |
| 2016/0029542 | A1 * | 2/2016 | Gschwendtner ....... A01B 63/10 |
| | | | 701/50 |

FOREIGN PATENT DOCUMENTS

| | | |
|---|---|---|
| EP | 1640512 A2 | 3/2006 |
| JP | S55153505 A | 11/1980 |

OTHER PUBLICATIONS

European Patent Office, International Search Report related to International Patent Application No. PCT/EP2020/065114, mail date Sep. 11, 2020.

* cited by examiner

IMPLEMENT HITCH CONTROL SYSTEM

FIELD OF THE INVENTION

The invention relates to agricultural vehicles, such as farm tractors, having a front or rear hitch to which an agricultural implement is attachable, and in particular to systems for controlling the raising, lowering and intermediate positioning of such hitches.

BACKGROUND

A hitch, such as a three-point linkage is a known arrangement used to attach implements to the front or rear of a driving/drawing vehicle, for example an agricultural tractor. The implement may be fully mounted or semi-mounted on the tractor whereby a semi-mounted implement has a wheel engaging with the ground during soil operation while a fully-mounted implement puts all its load on the three-point linkage.

Three point linkages most frequently consist of two lower lifting arms to which an implement is attached. The lower lifting arms can be pivoted by one or respective hydraulic actuating cylinders to adjust the height position of the implement relative to the tractor. An additional top link in a three point linkage connects the implement to the tractor above the lower lifting arms. This top link is used to pivot the implement about a horizontal transverse axis and is typically adjustable by means of a threaded connection, or a hydraulic cylinder.

To control positioning of the three-point linkage or other variable height hitch, modern tractors are commonly equipped with electronic hitch/linkage control systems to improve work quality and operator comfort during operation. Such control systems typically include a user-operated rocker control device in the form of a multi-position switch, lever or joystick, whereby movement of the rocker control device in a first direction (e.g. away from the user) effects lowering of the hitch to engage an implement such as a plough with the soil in a field to be tilled. Movement of the rocker control device in a second direction (e.g. towards the user) effects raising the hitch to disengage the implement from the soil and optionally hold it in a fully raised position, for example to facilitate travel of the vehicle and implement on public roads. Suitably, a cessation of user movement of the rocker control device (for example placing it in a central/"neutral" position) results in the hitch being held at its current orientation—that is to say the previously directed height of the hitch and implement relative to the vehicle and/or the ground on which it stands. Examples of electronic hitch control systems are described in U.S. Pat. Nos. 9,883, 622, 9,181,965 and 6,196,327.

Such electronic linkage control systems may operate to raise and lower an attached implement in a number of modes. In a speed control mode, the direction of hitch travel (up or down) is determined by the direction of movement of the rocker control device, and the speed of hitch movement is varied in dependence on the distance of the user-input rocker control device position relative to a central/neutral position—i.e. the further the user pushes/pulls the rocker control device away from the neutral position, the faster the hitch (and attached implement) will move.

In a position control mode, typically two or more predetermined heights for the hitch relative to the vehicle are stored in the control system. These predetermined heights, which may represent soil engagement (for an attached implement such as a plough), soil disengagement (lifting the implement clear for e.g. a headland turn), and/or transport (fully raised for road travel) may be preset by a user, and movement of the rocker control device is used to simply switch between these predetermined positions of the hitch.

Other control modes are known, such as a towing mode in which the hitch is permitted to move up and down freely in response to movement of an attached implement (e.g. over rough ground), and a draft mode in which the height of the hitch is varied in response to drag force on an attached implement (e.g. varying the depth of engagement of a plough in response to detected soil conditions).

Switching between previously stored positions for the hitch may require the user operation of one or more control devices (other than the rocker control device) and conventionally requires the user to recall whether an upward or downward movement is required, which may result in confusion and/or delay.

Additionally, switching between these different control modes conventionally requires the user operation of one or more control devices (other than the rocker control device) which may result in confusion and/or delay.

SUMMARY OF THE INVENTION

According to a first aspect of the present invention there is provided a control system for an implement hitch of an agricultural vehicle, wherein the hitch is mounted to the vehicle and includes one or more actuators operable to raise and lower the hitch between minimum and maximum heights relative to the vehicle and hold the hitch static at one or more heights between the minimum and maximum heights, the control system comprising:

a rocker control device having a first operating position (C) and being movable in a first direction to a first limit position (A) and in a second direction to a second limit position (E);

an electronic control unit (ECU) connected to the rocker control device and configured to control operation of the or each of the actuators and thereby control raising and lowering of the hitch in response to user operation of the rocker control device;

wherein the ECU is operable to control raising and lowering of the hitch to move it to a selected one of two or more previously stored positions between the said minimum and maximum heights, and to switch between said previously stored positions in response to a predetermined first actuation operation of the rocker control device.

It is a particular benefit that the same rocker control device is used to control the raising and lowering of the hitch and is further used for switching between previously stored positions without using an additional control element of the vehicle, thereby enabling a user, who may have turned around to observe the hitch/implement through the rear window of the vehicle cab, to control operations without having to turn back and select from other controls on an armrest or elsewhere in the cab.

Preferably, the ECU is configured to operate in a position control mode in which a resultant position of the hitch is determined by a position setpoint determined by the ECU, and the ECU is suitably operable to receive a position setpoint in response to an instance of the predetermined first actuation operation of the rocker control device.

Preferably, the ECU is operable to raise or lower the position setpoint by an amount determined by the degree of offset of the rocker control device from the first operating position and to move the hitch towards the position setpoint and to hold the position of the hitch if the setpoint was reached by the hitch.

The ECU is preferably configured to receive and store the two or more pre-stored positions and to set one of the pre-stored positions as the position setpoint in response to the first predetermined actuation operation of the rocker control device, and thereafter to move the hitch to the position setpoint.

The predetermined first actuation operation may comprise toggling the rocker control device into and out of the first limit position.

The ECU is suitably operable to detect a holding of the rocker control device in the first limit position (A) longer than a threshold time limit, especially 300 milliseconds, and to lower the hitch to its minimum position as long as the rocker control device is depressed if the threshold time limit was expired.

Preferably, the ECU is operable to change over from switching between said previously stored positions to a further control mode in response to a predetermined second actuation operation of the rocker control device. In such an arrangement, the further control mode may be a speed control mode and the second actuation operation is determined by the ECU and comprises toggling the rocker control device into and out of the second limit position. The second actuation operation may further comprise movement of the rocker control device to a position between the first operating position and the first limit position.

According to a further aspect of the present invention there is provided an agricultural vehicle having an implement connection hitch, wherein the hitch is mounted to the vehicle and the vehicle includes one or more actuators operable to raise and lower the hitch between minimum and maximum heights relative to the vehicle and hold the hitch static at one or more heights between the minimum and maximum heights, the vehicle further comprising a control system according to the first aspect of the invention and operable to control movement of the hitch.

BRIEF DESCRIPTION OF THE DRAWINGS

The invention will now be described, by way of example only, with reference to the accompanying drawings in which.

DETAILED DESCRIPTION OF SPECIFIC EMBODIMENTS OF THE INVENTION

Figure 1:
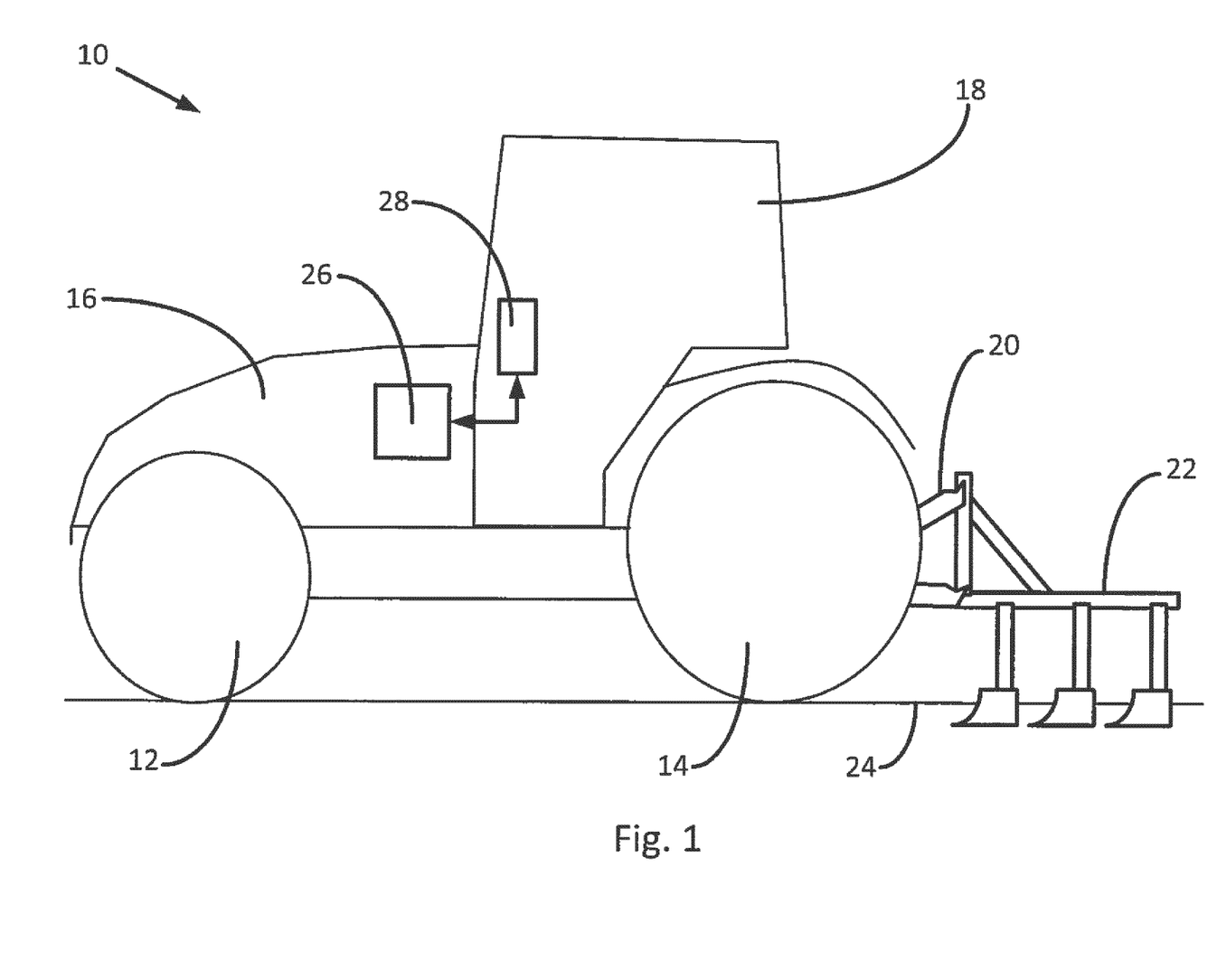
FIG. 1 schematically represents an agricultural vehicle in the form of a tractor having a rear implement hitch and user-operable means for control of the same.

In FIG. 1, a vehicle in the form of an agricultural tractor is indicated at 10. The tractor 10 comprises front wheels 12, rear wheels 14, an engine section 16 and a cab section 18. The tractor 10 further comprises a rear hitch 20 which may be raised or lowered relative to the rest of the tractor 10. An agricultural implement, in this case a plough 22, can be provided mounted to the hitch 20, such that lowering or raising of the hitch 20 brings the hitch-mounted implement 22 into or out of engagement with the ground 24. The tractor 10 further comprises at least one Electronic Control Unit (ECU) 26, which is arranged to control operation of various tractor systems. The cab section 18 is provided with operator controls 28 for control of the different components of the tractor 10, including the direct control of the height of the hitch 20. The operator controls 28 may comprise mechanical levers and/or electronic control systems incorporating configurable switches, touchscreen displays, etc. It will be understood that the ECU 26 is provided in communication with the operator controls 28.

Figure 2:
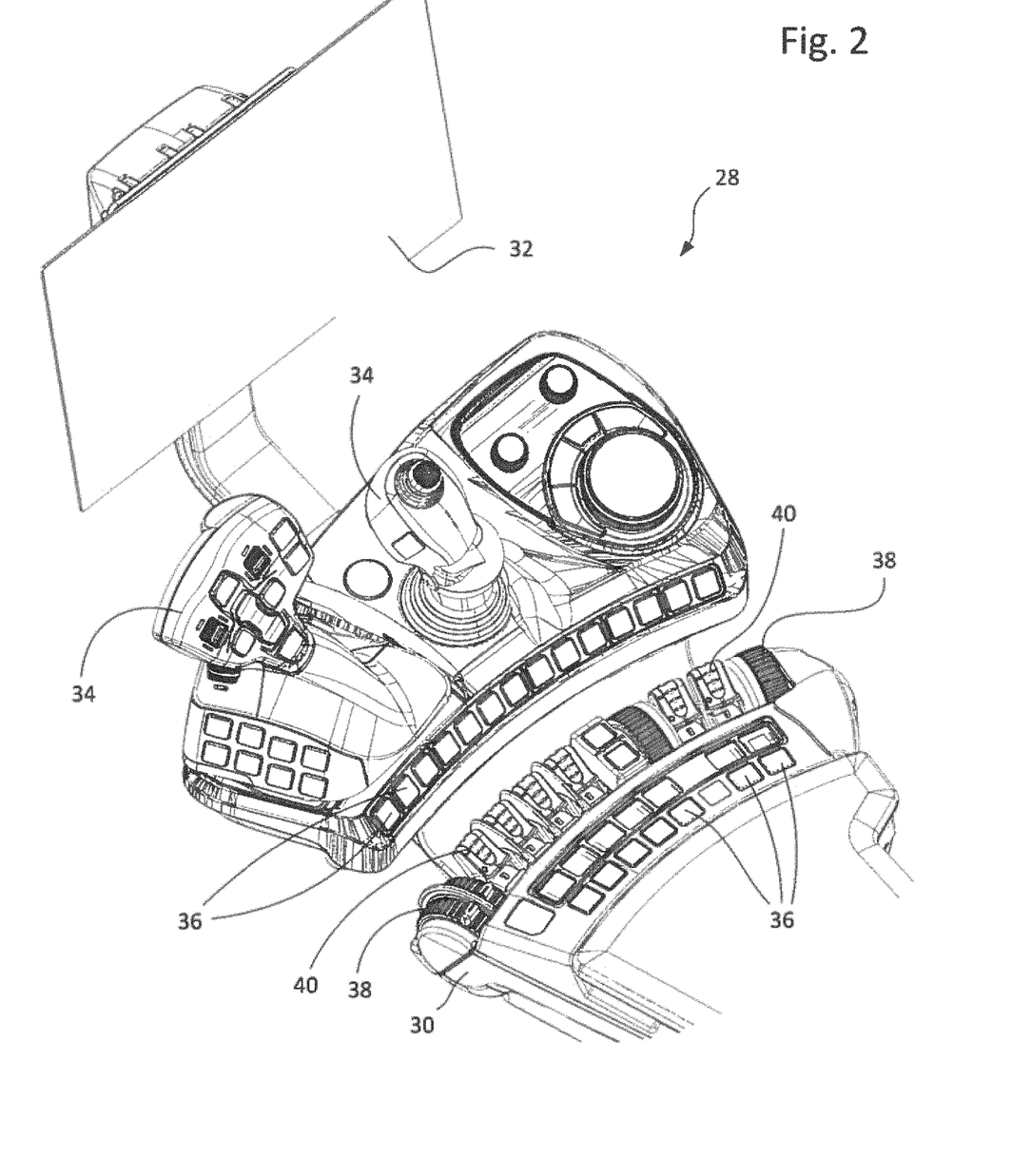
FIG. 2 shows an example of user operator controls in the form of an armrest console for the vehicle of FIG. 1, including one or more rocker control devices.

FIG. 2 shows an arrangement of operator controls 28 in the form of an armrest 30 containing a terminal/display 32, and various input elements as joysticks 34, buttons 36, turning wheels/potentiometers 38 and several rocker control devices (control levers) 40. At least one of these rocker control devices 40 is used as control element to direct upwards and downwards motion and intermediate positioning of the rear hitch 20.

Figure 3:
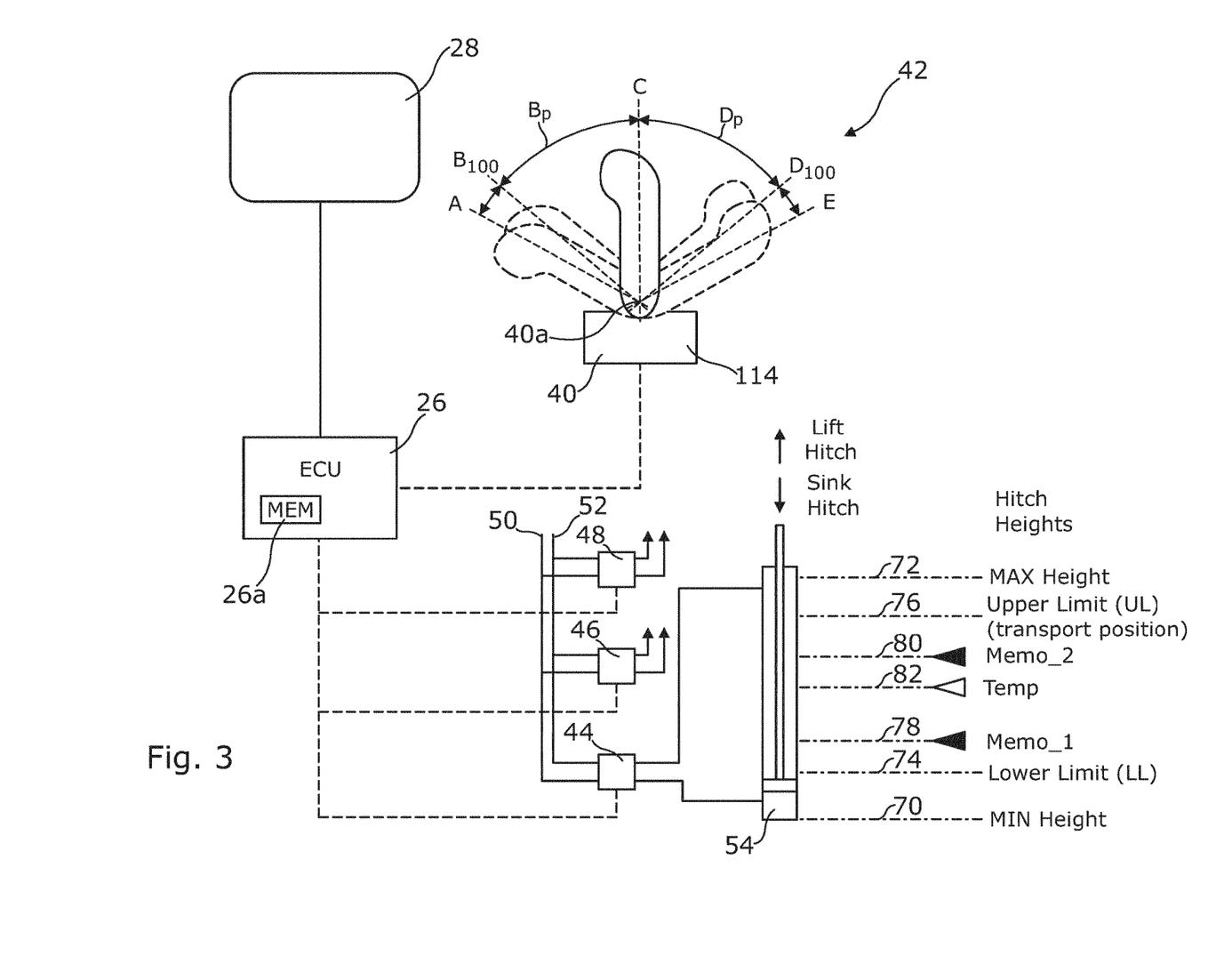
FIG. 3 schematically represents the control by an electronic control unit of the one or more hydraulic cylinders effecting movement of the implement hitch mounted on the vehicle of FIG. 1.

With reference to FIG. 3, a hydraulic apparatus control system 42 is installed on the agricultural tractor 10. The hydraulic apparatus control system 42 comprises three dual port spool valves 44, 46, 48 which are commonly installed on tractors of today. Each valve 44, 46, 48 has two inputs connected to a high pressure hydraulic source 50 and a low pressure (or tank) line 52.

A respective two-way hydraulic cylinder is connected to each valve 44, 46, 48 suitably by a quick-release coupling (not shown): for reasons of clarity, only hydraulic cylinder 54 connected to valve 44 is shown.

Each valve 44, 46, 48 serves to direct pressurised fluid from high pressure line 50 to the respective hydraulic cylinders in order to either extend or retract the respective piston rods as in known systems. To complete the hydraulic circuit during actuation, the valves 44, 46, 48 direct exhausted fluid to the low pressure line 52.

In the example shown each valve 44, 46, 48 is electrically activated by an integrated solenoid (not shown) and is thus connected electrically by wires 56, 58, 60 (shown as dashed lines in FIG. 3) to the ECU 26.

Also connected electrically to ECU 26 are the operator controls 28 including a rocker control device 40 (shown separately for reasons of clarity). As in known tractor hydraulic control systems, the rocker control device 40 can be deflected around a pivot axis 40a either side of a neutral position C, into which position the lever portion of the device is suitably biased by a spring (not shown).

The lever portion of the rocker control device 40 can be moved or switched into five different positions or ranges, indicated with A, $B_P$ ($B_{100}$), C, $D_P$ ($D_{100}$) and E, wherein:

Position A is a first (forward) maximum deflection limit position;

Position $B_{100}$ is a first (forward) normal operational limit position;

Position $B_P$ is a forward operating range between positions C (=$B_0$) and $B_{100}$;

Position C is the neutral position;

Position $D_{100}$ is a second (rearward) normal operational limit position;

Position $D_P$ is a rearward operating range between positions C (=$D_0$) and $D_{100}$; and Position E is a second (rearward) maximum deflection limit position.

The hitch 20 (as driven by hydraulic cylinder 54) can be raised or lowered according to the deflection of the rocker control device 40. In a first control mode (speed control mode) under the direction of the ECU 26, the more the lever portion of the rocker control device 40 is deflected in direction $B_P$ or $D_P$ away from the neutral position C, the greater the fluid pressure applied to cylinder 54 via valve 44 and the faster the hitch 20 moves.

As indicated at the right-hand side of FIG. 3, the hitch 20 can be driven between the two mechanical limits of the vehicle and hitch construction MIN Hight 70 and MAX Hight 72. Between these two mechanical limits, additional positions can be set as predetermined parameters by a user or manufacturer of the system, including:

Lower Limit (LL) 74—suitably a lower normal operational position;

Upper Limit (UL) 76—suitably an upper normal operational position which suitably also corresponds to the road transport position for the hitch 20—with or without an implement attached;

Memo_1 78—a preferred lower operational position set and stored by the user;

Memo_2 80—a preferred upper operational position set and stored by the user; and Temp 82—a short-term stored position, as described further below.

These parameters can be set for example by using a turning wheel 38 of the armrest 30 and pressing a storing button 36. Similarly speed limits for lowering or raising the hitch ($V_{sink}$, $V_{lift}$) can be set, for example by touchscreen input on the display 32 and/or via the buttons 36.

In addition to speed control mode, the hitch 20 can be driven under control of the ECU 26 in a position control mode. In this mode, the deflection of the rocker control device 40 will produce a height demand proportional to the deflection away from the neutral position C instead of a speed demand. In position control mode, rocker control device position $B_{100}$ corresponds to the lower limit position (LL) 74 of the hitch and rocker control device position $D_{100}$ corresponds to the upper limit position (UL) 76 of the hitch.

As explained further below, it is a particular benefit that the same rocker control device 40 as used to control the hitch in speed control mode can also be used to control the hitch in position control mode. Switching between both modes is also done with the same rocker control device without using an additional control element of the armrest, thereby enabling a user, who may have turned around to observe the hitch/implement through the rear window of the vehicle cab, to control operations without having to turn back and select from other controls on the armrest 30 or elsewhere in the cab.

Figure 4A:
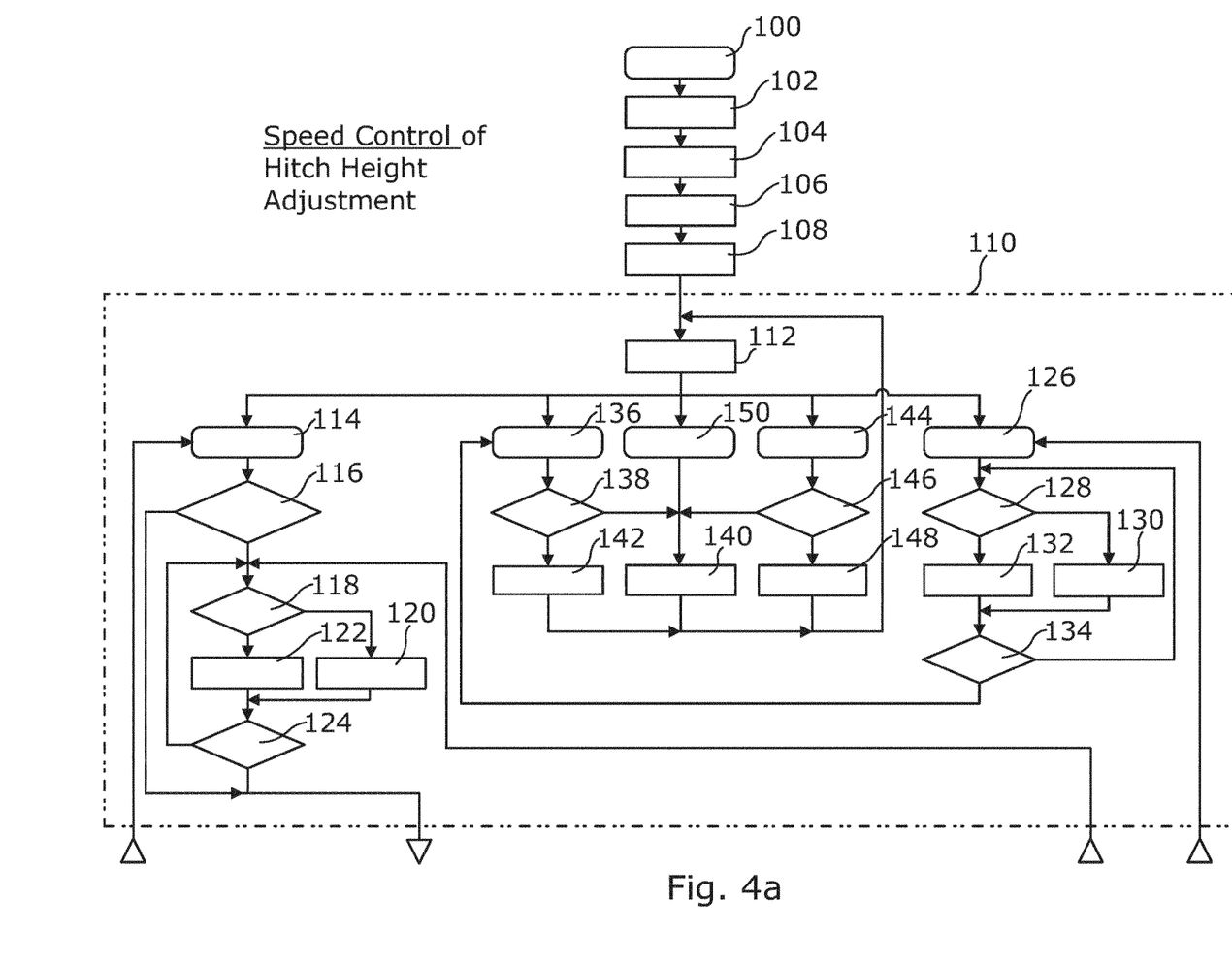
FIGS. 4a and 4b together comprise a flowchart detailing operation of the electronic control unit of FIG. 3 in providing user-directed control of the implement hitch of FIG. 1.
Figure 4B:
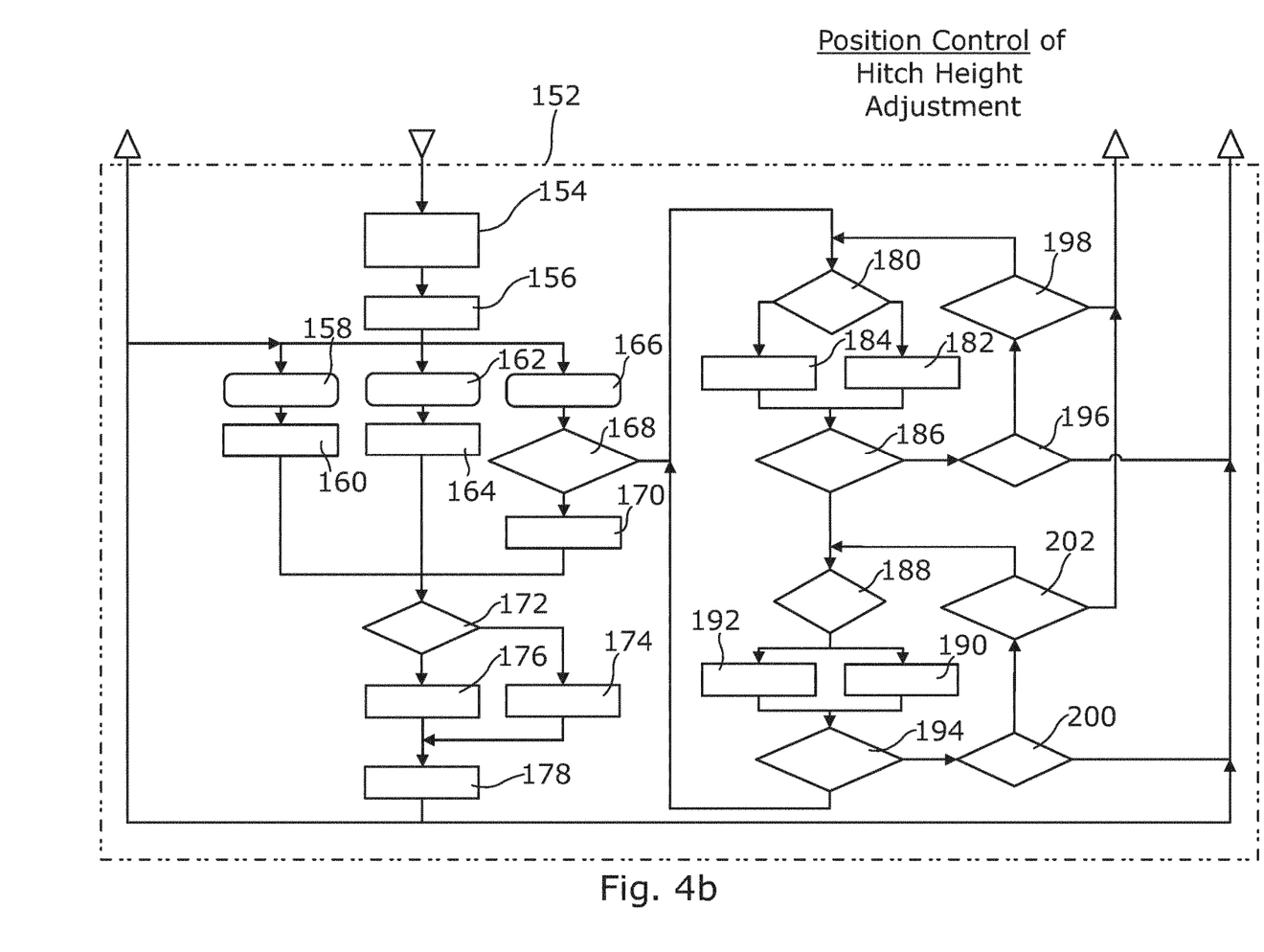

FIGS. 4a and 4b together provide a flowchart illustrating the operations embedded within control logic in the ECU 26 which enable a single rocker control device 40 to control operation of the hitch in each of at least two different control modes, as well as switching between modes.

Following the start of the process (indicated generally at 100 in FIG. 4a), the operations commence with the receiving and storing of the predetermined parameters, as described above with reference to FIG. 3.

At step 102, the upper and lower normal operational limits UL 76, LL 74 are received and stored.

At step 104, two (optionally more) user-defined operational positions Memo_1 78 and Memo_2 80 are received and stored.

At step 106, input values for the upward hitch speed $V_{lift}$ and downward hitch speed $V_{sink}$ are received and stored.

At step 108, the ECU places the system in operational mode selecting a speed control operating mode, and the rocker control device 40 becomes available to control operation. Preferably, prior to this, the rocker control device is biased to the neutral position C by a spring or other suitable means.

With the system now in a speed control mode (the steps within which are generally indicated within dashed outline 110), the first operation is to check the position of the rocker control device 40, at step 112.

If, at step 114, it is determined that the rocker control device is in position A (forward maximum deflection limit position), the process moves to step 116 in which it is determined whether the rocker control device 40 has been held in position A for longer than a predetermined time limit. This time limit may be adjustable by the user. This time limit, referred to hereinafter as the Threshold time, is preferably less than one second, and suitably 300 ms (or close thereto).

The ECU 26 differentiates between momentary (toggling) placements of the rocker control device 40 into and out of a particular position (indicating a system setting operation) and those longer than the Threshold time, with the latter being deliberate placements which are identified by the ECU 26 as separate hitch control commands.

If, at step 116, it is determined that the user has toggled position A (that is to say moved the rocker control device into and out of position A in less than the Threshold time), the ECU 26 places the system into position control mode and again checks the position of the rocker control device, as described below with reference to step 156 and following.

If step 116 indicates that the user has selected position A (i.e. the rocker control device 40 remains in position A for greater than or equal to the Threshold time), the ECU 26 operates the valve 44 and cylinder 54 to commence moving the hitch downwards with a velocity of $V_{sink}$ (user input value from step 106). Alternately, in this mode, the ECU 26 may apply a system-set (generally faster) downwards velocity $V_{max}$.

With the hitch descending as a result of step 116, at step 118 it is determined whether the lower mechanical limit of hitch movement MIN Hight 70 has been reached. If so, the hitch 20 is held at this minimum height in step 120. If step 118 determines that the lower mechanical limit of hitch movement MIN Hight 70 has not been reached, the downwards velocity of the hitch 20 is set to $V_{max}$ at step 122.

Following steps 120 and 122, a check is made at step 124 as to whether the rocker control device is still in position A. If so, the process cycles back to step 118 (MIN Hight 70 reached?).

If the rocker control device is no longer in position A (i.e. the rocker control device was moved out of position A and the toggle action was completed), the ECU 26 places the system into position control mode and checks for a temporary position setting (Temp 82) as described below with reference to step 154.

If, following step 112, it is determined at step 126 that the rocker control device 40 is in position E (rearward maximum deflection limit position), upward movement of the hitch 20 is initiated. At step 128 it is determined whether the upper mechanical limit of hitch movement MAX Hight 72 has been reached. If so, the hitch 20 is held at this maximum height in step 130. If step 128 determines that the upper mechanical limit of hitch movement MAX Hight 72 has not been reached, the upwards velocity of the hitch 20 is set to $v_{max}$ at step 132.

Following steps 130 and 132, a determination is made at step 134 as to whether a position in the range $B_P$ (between $C=B_0$ and $B_{100}$) is now indicated by the rocker control device 40, that is to say a toggle action of the rocker control device 40 into and out of position E was completed.

If not, the process cycles back to step 128. If so, the process moves to step 136 (determination that the rocker control device 40 is in position $B_P$). Note that step 136 may also follow step 112 if the initial determination at that step shows that the rocker control device 40 is in position $B_P$.

Following step 136, the hitch 20 is directed to move downwards by the ECU 26. A check at step 138 determines whether the lower limit position (LL) 74 of the hitch 20 has been reached. If so, the hitch 20 is held at that position in step 140, and the process cycles back to checking the position of the rocker control device 40 at step 112. If step 138 indicates that the lower limit position (LL) 74 of the hitch has not been reached, at step 142 the value of P in position $B_P$ (where P ranges from zero to 100%) is determined, and the downwards velocity v of the hitch 40 is set to:

$$V = P \% \times V_{sink}$$

Following step 142, the process cycles back to step 112 (checking the position of the rocker control device 40).

If, following step 112, a determination is made at step 144 that a position in the range $D_P$ (between $C=D_0$ and $D_{100}$) is now indicated by the rocker control device 40, the hitch 20 is directed to move upwards by the ECU 26. A check at step 146 determines whether the upper limit position (UL) 76 of the hitch 20 has been reached. If so, the hitch 20 is held at that position in step 140, and the process cycles back to checking the position of the rocker control device 40 at step 112. If step 146 indicates that the upper limit position (UL) 76 of the hitch 20 has not been reached, at step 148 the value of P in position $D_P$ (where P ranges from zero to 100%) is determined, and the upwards velocity v of the hitch 20 is set to:

$$V = P \% \times V_{lift}$$

Following step 148, the process cycles back to step 112 (checking the position of the rocker control device).

If, following step 112, a determination is made at step 150 that the rocker control device 40 is in the neutral position C, the hitch 20 is held in its current position in step 140, and the process cycles back to checking the position of the rocker control device 40 at step 112.

Turning now to operations in the position control mode, as particularly illustrated in FIG. 4b and outlined by dashed line 152, in a first step at 154 (following the ECU 26 placing the system into position control mode as a result of detected toggling of the rocker control device through position A in step 116 or 124) the ECU 26 receives and stores a temporary position setting (Temp 82), which is suitably a user-defined hitch position to be modified by forwards/backwards movement of the rocker control device 40.

Following step 154, at step 156 a determination is made as to the current position of the lever portion of the rocker control device 40.

If it is determined in step 158 that the rocker control device 40 is in a position within the range $B_P$, then at step 160 the value of the temporary position setting Temp 82 is reduced. If however, it is determined in step 162 that the rocker control device 40 is in a position within the range $D_P$, then at step 164 the value of the temporary position setting Temp 82 is increased. If it is determined in step 166 that the rocker control device 40 is in the neutral position C, a determination as to whether the rocker control device 40 has been toggled into position A and out to position C is made at step 168. If step 168 does not show toggling of the rocker control device 40, then at step 170 the value of the temporary position setting Temp 82 is held at its current value. The current value of the temporary position setting Temp 82 is suitably illustrated to the user in the form of a numerical value or graphical indicator on the display screen 32 (FIG. 2) in the vehicle cab.

Following steps 160, 164 and 170, a check is made at step 172 as to whether the current hitch height is equal to the stored value for Temp 82. If so, then at step 174 the hitch 20 is held at its current position. If not, then at step 176 the hitch 20 is moved upwards or downwards as appropriate to place it in the Temp position 82.

Following steps 174 and 176, a further check is made at step 178 as to the position of the rocker control device 40. If the rocker control device 40 is in position A, the process returns to step 114 with the ECU 26 reverting to speed control mode, although this will immediately return to position control mode and step 154 if the user has only toggled position A (due to step 116 or 124).

If at step 178 it is determined that the rocker control device 40 is in position E, the process returns to step 126 with the ECU 26 reverting to speed control mode and the hitch 20 being raised towards MAX Hight 72.

If at step 178 it is determined that the rocker control device 40 is in position $B_P$, $D_P$ or C, the process returns to respective steps 158, 162 or 166 with the ECU 26 remaining in position control mode of the hitch 20.

In order to step out of the Temp setting process within the position control mode 152, the user toggles the rocker control device 40 from the neutral position C to position A and out again. This action is detected at step 168 (mentioned above) which moves the process to step 180 on the right-hand side of FIG. 4b.

At step 180, it is determined whether the current hitch height equals the first user-stored height value Memo_1 78. If so, at step 182, the ECU 26 holds the hitch 20 at its current position. If not, at step 184 the ECU 26 directs movement of the hitch 20 to the position specified for Memo_1 78.

Following on from steps 182 and 184, at step 186 it is again checked whether the user has toggled the rocker control device 40 to position A and back. If so, this is the trigger for the system to move to the second stored value Memo_2 80, and at step 188, it is determined whether the current hitch height equals Memo_2. If so, at step 190, the ECU 26 holds the hitch 20 at its current position. If not, at step 192 the ECU 26 directs movement of the hitch 20 to the position 80 specified for Memo_2.

Following on from steps 190 and 192, at step 194 it is again checked whether the user has toggled the rocker control device 40 to position A and back. If so, this is the trigger for the system to move back to the first stored value Memo_1 78 and step 180 where it is again determined whether the current hitch height equals Memo_1.

If, at step 186, it is identified that the rocker control device 40 has not been toggled to position A, then at step 196 it is determined whether the rocker control device 40 has been set to the second limit position, namely position E. If position E has been chosen at step 196, this triggers reversion of the ECU 26 to operating in the speed control mode, commencing at steps 126 and 128 and the raising of the hitch 20 towards the MAX-Hight position 72 with maximum speed $V_{max}$ as defined by the user.

If, at step 196, it is determined that the rocker control device 40 has not been set to the second limit position, namely position E, then the process moves to step 198 where it is determined whether the rocker control device 40 has been set to the first limit position, namely position A, for longer than the Threshold time (which would otherwise indicate a toggling action at step 186). If position A has been chosen at step 198, this triggers reversion of the ECU 26 to operating in the speed control mode of the hitch 20, commencing at step 118 and the lowering of the hitch towards the MIN-Hight position 70.

If step 198 does not indicate that position A has been selected for longer than the Threshold time in order to change the operating mode back to speed control mode, then the mode remains in position control mode of the hitch 20 and the process reverts to step 180 (moving the hitch 20 to, or maintaining it in, the Memo_1 position 78).

In like manner to step 186 above, if it is identified in step 194 that the rocker control device 40 has not been toggled to position A, then at step 200 it is determined whether the rocker control device 40 has been set to the second limit position, namely position E. If position E has been chosen at step 200, this triggers reversion of the ECU 26 to operating in the speed control mode, commencing at steps 126 and 128 and the raising of the hitch towards the MAX-Hight position 72.

If, at step 200, it is determined that the rocker control device 40 has not been set to the second limit position, namely position E, then the process moves to step 202 where it is determined whether the rocker control device 40 has been set to the first limit position, namely position A, for longer than the Threshold time (which would otherwise indicate a toggling action at step 194). If position A has been chosen at step 202, this triggers reversion of the ECU 26 to operating in the speed control mode, commencing at step 118 and the lowering of the hitch 20 towards the MIN-Hight position 70.

If step 202 does not indicate that position A has been selected for longer than the Threshold time in order to change the operating mode back to speed control mode, then the mode remains in position control mode and the process reverts to step 188 (moving the hitch 20 to, or maintaining it in, the Memo_2 position 80).

In the foregoing, the applicants have described a control system 42 for an implement hitch of an agricultural vehicle, wherein the hitch is mounted to the vehicle and includes one or more hydraulic cylinders 54 or other actuators operable to raise and lower the hitch between minimum and maximum heights (MIN_Hight 70, and MAX_Hight 72) relative to the vehicle and hold the hitch static at one or more heights between the minimum and maximum heights. The control system 42 includes a rocker control device 40 having a first operating position C and being movable in a first direction to a first limit position A and in a second direction to a second limit position E. An electronic control unit (ECU) 26 is connected to the rocker control device and controls operation of the or each of the hydraulic cylinders 54 or actuators and thereby control raising and lowering of the hitch in response to user operation of the rocker control device. The ECU 26 is operable to control raising and lowering of the hitch to move it to a selected one of two or more previously stored positions Memo_1 78, Memo_2 80 between the said minimum and maximum heights, and to switch between the said previously stored positions in response to a predetermined first actuation operation of the same rocker control device 40. Preferably, the same rocker control device 40 is used to control the input and storage of at least one further height value Temp 82.

From reading the present disclosure, other modifications will be apparent to persons skilled in the art. Such modifications may involve other features which are already known in the field of agricultural vehicles and component parts therefore and which may be used instead of or in addition to features already described herein. For example instead of the hydraulic cylinders 54 other types of actuators could be used: the hydraulic cylinders 54 could be substituted by an electromechanical actuator comprising an electric motor and a gear drive, e.g. a spindle gear drive whereas the motor drives the spindle and the spindle transforms a rotating movement into a translational movement comparable to the translational movement of the hydraulic cylinder 54.

The invention claimed is:

1. A control system for an implement hitch of an agricultural vehicle, wherein the hitch is mounted to the vehicle and includes one or more actuators operable to raise and lower the hitch between minimum and maximum heights relative to the vehicle and hold the hitch static at one or more heights between the minimum and maximum heights, the control system comprising:
   a rocker control device having a first operating position and being movable in a first direction to a first limit position and in a second direction to a second limit position; and
   an electronic control unit (ECU) connected to the rocker control device and configured to control operation of each of the actuators and thereby control raising and lowering of the hitch in response to operation of the rocker control device;
   wherein the ECU is operable to control raising and lowering of the hitch to move it to a selected one of at least two previously stored positions between the minimum and maximum heights, and to switch between the previously stored positions in response to a predetermined first actuation operation of the rocker control device,
   wherein the ECU is configured to operate in a position control mode in which a resultant position of the hitch is determined by a position setpoint determined by the ECU, and
   wherein the ECU is configured to receive and store the at least two previously stored positions and to set one of the previously stored positions as the position setpoint in response to the first predetermined actuation operation of the rocker control device, and thereafter to move the hitch to the position setpoint.

2. The control system of claim 1, wherein the ECU is operable to receive the position setpoint in response to an instance of the predetermined first actuation operation of the rocker control device.

3. The control system of claim 1, wherein the ECU is operable to raise or lower the position setpoint by an amount determined by the degree of offset of the rocker control device from the first operating position and to move the hitch towards the position setpoint and to hold the position of the hitch when the setpoint is reached by the hitch.

4. The control system of claim 1, wherein the predetermined first actuation operation comprises toggling the rocker control device into and out of the first limit position.

5. The control system of claim 1, wherein the ECU is operable to detect a holding of the rocker control device in the first limit position longer than a threshold time limit, especially 300 milliseconds, and to lower the hitch to the minimum position as long as the rocker control device is depressed and the threshold time limit is expired.

6. The control system of claim 1, wherein the ECU is operable to change from switching between the previously stored positions to switching to a further control mode in response to a predetermined second actuation operation of the rocker control device.

7. The control system of claim 6, wherein the further control mode is a speed control mode and the predetermined second actuation operation is determined by the ECU and comprises toggling the rocker control device into and out of the second limit position.

8. The control system of claim 6, wherein the further control mode is a speed control mode and the second actuation operation is determined by the ECU and comprises toggling the rocker control device into and out of the second limit position and thereafter movement of the rocker control device to a position between the first operating position and the first limit position.

9. An agricultural vehicle having an implement connection hitch, wherein the hitch is mounted to the vehicle and the vehicle includes at least one actuator operable to raise and lower the hitch between minimum and maximum heights relative to the vehicle and hold the hitch static at at least one height between the minimum and maximum heights, the vehicle further comprising the control system of claim 1, operable to control movement of the hitch.

* * * * *